(12) United States Patent
Lunttila et al.

(10) Patent No.: US 8,830,939 B2
(45) Date of Patent: Sep. 9, 2014

(54) HIGH SPEED PACKET ACCESS DOWNLINK FEEDBACK TIMING ON LONG TERM EVOLUTION UPLINK

(75) Inventors: Timo E. Lunttila, Espoo (FI); Karri M. Ranta-Aho, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 100 days.

(21) Appl. No.: 13/418,510

(22) Filed: Mar. 13, 2012

(65) Prior Publication Data

US 2012/0236804 A1  Sep. 20, 2012

Related U.S. Application Data (60) Provisional application No. 61/452,340, filed on Mar. 14, 2011.

(51) Int. Cl.
| | |
|---|---|
| *H04W 72/04* | (2009.01) |
| *H04L 1/00* | (2006.01) |
| *H04L 1/16* | (2006.01) |
| *H04L 5/00* | (2006.01) |
| *H04L 1/18* | (2006.01) |
| *H04W 84/12* | (2009.01) |
| *H04L 1/06* | (2006.01) |

(52) U.S. Cl.
CPC .............. *H04L 1/0027* (2013.01); *H04L 1/0026* (2013.01); *H04L 1/1671* (2013.01); *H04L 5/0007* (2013.01); *H04L 1/06* (2013.01); *H04L 1/1887* (2013.01); *H04L 5/001* (2013.01); *H04L 5/0057* (2013.01); *H04L 5/0055* (2013.01); *H04L 1/1861* (2013.01)
USPC ............ 370/329; 370/348; 370/341; 455/450

(58) Field of Classification Search
CPC ....... H04L 1/0026; H04L 1/0027; H04L 1/06; H04L 1/1671; H04L 1/1861; H04L 1/1887; H04L 5/0007; H04L 5/001; H04L 5/0055; H04L 5/0057; H04W 72/0413; H04W 72/1284; H04W 88/06; H04W 72/04
See application file for complete search history.

(56) References Cited

U.S. PATENT DOCUMENTS

| | | | | |
|---|---|---|---|---|
| 2010/0271970 | A1* | 10/2010 | Pan et al. | 370/252 |
| 2011/0134831 | A1  | 6/2011 | Pirskanen | 370/328 |
| 2011/0141959 | A1* | 6/2011 | Damnjanovic et al. | 370/311 |
| 2011/0268048 | A1  | 11/2011 | Toskala et al. | 370/329 |
| 2012/0039199 | A1* | 2/2012 | Chen et al. | 370/252 |
| 2012/0082145 | A1* | 4/2012 | Chen et al. | 370/338 |

OTHER PUBLICATIONS

Nokia Siemens Networks et al., 3GPP TSG RAN WG1 Meeting #58bis, R1-093905, "UL control signalling for carrier aggregation", Miyazaki, Japan, Oct. 12-16, 2009, 4 pages.

(Continued)

*Primary Examiner* — Un C Cho
*Assistant Examiner* — Mostazir Rahman
(74) *Attorney, Agent, or Firm* — Harrington & Smith (57) ABSTRACT

A method for HSPA DL feedback signaling using UL LTE subframes is described. The method includes composing UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The method also includes transmitting the UL feedback signaling on the plurality of UL LTE subframes. Apparatus and computer readable media are also described.

19 Claims, 6 Drawing Sheets

(56) References Cited

OTHER PUBLICATIONS

Ericsson et al., 3GPP TSG-RAN WG1 Meeting #64 R1-111089, "Spectrum migration from HSPA to LTE", Taipei, Taiwan, Feb. 2011, 4 pages.

Panasonic, 3GPP TSG RAN WGl Meeting #60, R1-101254, "Simultaneous transmission of Scheduling request indicator and ACK/NACK information for LTE-Advanced", San Francisco, USA, Feb. 2010, 5 pages.

Nokia Siemens Networks et al., 3GPP TSG RAN WG1 Meeting #64 R1-111017, "UCI details for carrier aggregation PUSCH", Taipei, Taiwan, Feb. 2011, 2 pages.

Nokia Siemens Networks et al., 3GPP TSG-RAN WG1 Meeting #64, R1-111060, "Aggregating HSDPA and LTE carriers", Taipei, Taiwan, Feb. 2011, 3 pages.

Nokia Siemens Networks et al., 3GPP TSG RAN WG1 Meeting #64, R1-111015, "Multiplexing CSI and carrier aggregation ACK/NACK on PUCCH", Taipei, Taiwan, Feb. 2011, 3 pages.

"UL ACK/NACK for Inter-Radio Access Technology Carrier Aggregation", Timo Lunttila et al., U.S. Appl. No. 12/906,520, filed Oct. 18, 2010, 41 pgs.

"$3^{rd}$ Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913 V9.0.0, Dec. 2009, 15 pgs.

"$3^{rd}$ Generation Partnership Project; Technical Specification Group Radio Access Network; Feasibility study for Further Advancements for E-UTRA (LTE-Advanced) (Release 9)", 3GPP TR 36.912 V9.3.0, Jun. 2010, 61 pgs.

"$3^{rd}$ Generation Partnership Project; Technical Specification Group Radio Access Network; Evolved Universal Terrestrial Radio Access (E-UTRA) and Evolved Universal Terrestrial Radio Access Network (E-TRAN); Overall description; Stage 2 (Release 10)", 3GPP TS 36.300 V10.2.0, Dec. 2010, 200 pgs.

3GPP TS 36.300 V8.11.0, "Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Dec. 2009, 148 pages.

\* cited by examiner

HIGH SPEED PACKET ACCESS DOWNLINK FEEDBACK TIMING ON LONG TERM EVOLUTION UPLINK

CROSS-REFERENCE TO RELATED APPLICATIONS

This patent application claims priority under 35 U.S.C. §119(e) from U.S. Provisional Patent Application No. 61/452,340, filed Mar. 14, 2011, the disclosure of which is incorporated by reference herein in its entirety.

TECHNICAL FIELD

The exemplary and non-limiting embodiments relate generally to wireless communication systems, methods, devices and computer programs and, more specifically, relate to control signaling between mobile nodes and network access nodes in a wireless communication system using carrier aggregation.

BACKGROUND

This section is intended to provide a background or context. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACK acknowledge
BS base station
CQI channel quality indicator
DL downlink (eNB towards UE)
eNB E-UTRAN Node B (evolved Node B)
EPC evolved packet core
E-UTRAN evolved UTRAN (LTE)
FDMA frequency division multiple access
HARQ hybrid automatic repeat request
HSDPA high speed downlink packet access
HSPA high speed packet access
IMTA international mobile telecommunications association
ITU-R international telecommunication union-radiocommunication sector
LTE long term evolution of UTRAN (E-UTRAN)
LTE-A LTE advanced
MAC medium access control (layer 2, L2)
MIMO multiple input multiple output
MM/MME mobility management/mobility management entity
NACK negative acknowledge
NodeB base station
O&M operations and maintenance
OFDMA orthogonal frequency division multiple access
PCI precoding control indicator
PDCP packet data convergence protocol
PHY physical (layer 1, L1)
PUCCH physical uplink control channel
PUSCH physical uplink shared channel
RAT radio access technology
Rel release
RLC radio link control
RRC radio resource control
RRM radio resource management
SC-FDMA single carrier, frequency division multiple access
SGW serving gateway
TB transport block
TDM time division multiplex
TTI transmit time interval
UE user equipment, e.g., a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 and Release 10 versions of at least some of these specifications have been published including 3GPP TS 36.300, V10.2.0 (2010-12).

Figure 1A:
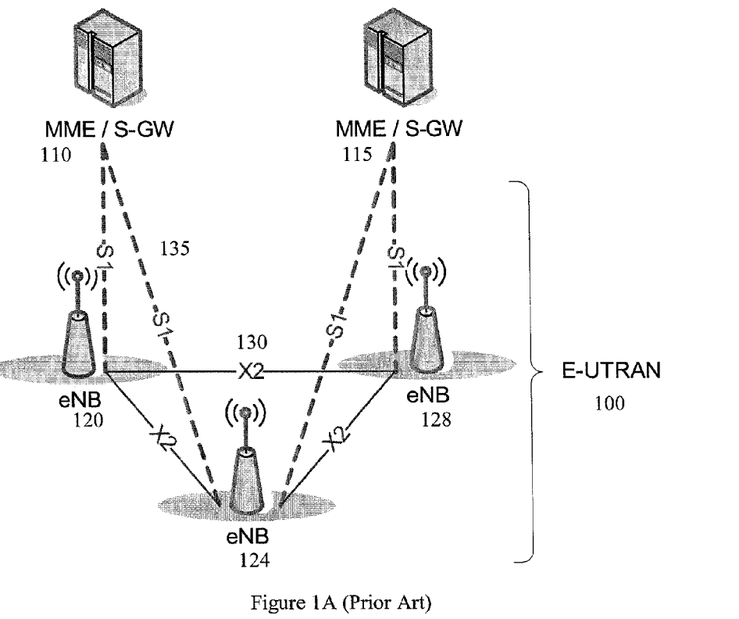
FIG. 1A reproduces FIG. 4-1 of 3GPP TS 36.300, and shows the overall architecture of the EUTRAN system.

FIG. 1A reproduces FIG. 4-1 of 3GPP TS 36.300 and shows the overall architecture of the EUTRAN system (Rel-8) 100. The E-UTRAN system 100 includes eNBs 120, 124, 128, providing the E-UTRAN user plane (PDCP/RLC/MAC/PHY) and control plane (RRC) protocol terminations towards the UEs (not shown). The eNBs 120, 124, 128 are interconnected with each other by means of an X2 interface 130. The eNBs 120, 124, 128 are also connected by means of an S1 interface 135 to an EPC, more specifically to a MME by means of a S1 MME interface and to a S-GW by means of a S1 interface (MME/S-GW 110, 115). The S1 interface 135 supports a many-to-many relationship between MMEs/S-GWs/UPEs 110, 115 and eNBs 120, 124, 128.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913 V9.0.0 (2009-12) Technical Report 3rd Generation Partnership Project; Technical Specification Group Radio Access Network; Requirements for further advancements for Evolved Universal Terrestrial Radio Access (E-UTRA) (LTE-Advanced) (Release 9). Reference can also be made to 3GPP TR 36.912 V9.3.0 (2010-06) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that the wider bandwidths for LTE-A are achieved through aggregating up to 5 component carriers, each up to 20 MHz wide to achieve the up to 100 MHz wide spectrum allocation. The carrier aggregation could be contiguous or non-contiguous, that is, the component carriers may be adjacent to each other, or non-adjacent to each other. This technique, as a bandwidth extension, can provide significant gains in terms of peak data rate and cell throughput as compared to non-aggregated operation as in LTE Rel-8 where the maximum operation bandwidth is 20 MHz.

A LTE-A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system. This requirement is met by ensuring that at least one LTE-A component carrier follows the Rel-8 LTE specifications.

Figure 1B:
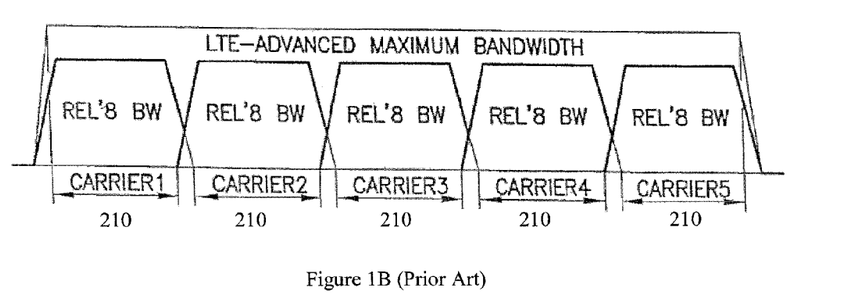
FIG. 1B shows an example of carrier aggregation as specified for the LTE-A system.

FIG. 1B shows an example of the carrier aggregation, where M Rel-8 component carriers 210 are combined together to form M times Rel-8 BW (e.g. 5*20 MHz=100 MHz given M=5). Rel-8 terminals receive/transmit on one component carrier 210, whereas LTE-A terminals may receive/transmit on multiple component carriers 210 simultaneously to achieve higher (wider) bandwidths.

Figure 1C:
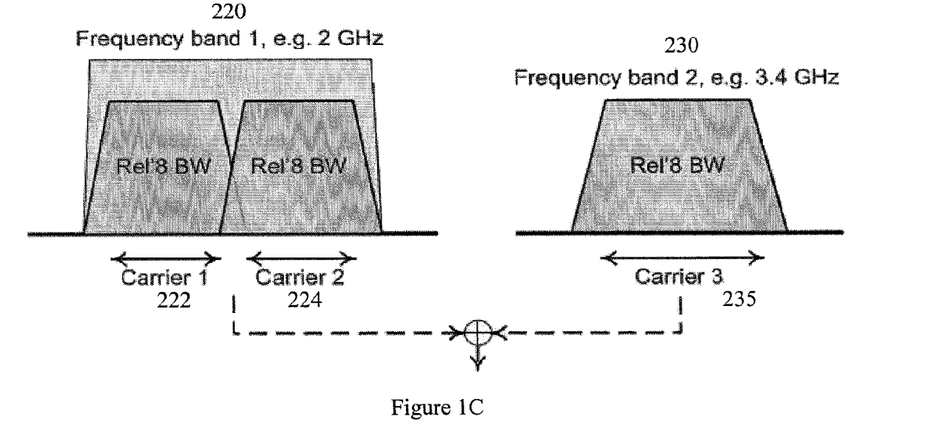
FIG. 1C also shows examples of LTE-A carrier aggregation.

FIG. 1C shows another example of the carrier aggregation where two component carriers 222, 224 are adjacent to each other on one frequency band 220, and a third component carrier 235 is on another frequency band 230 non-adjacent to the other two. Both intra-band (Carriers 1 and 2) and inter-band (Carrier 3 combined with Carriers 1 and 2) carrier aggregation are shown.

Similar carrier aggregation work has also been carried out in the 3GPP in the context of HSDPA from Release 8 onwards. Release 8 specified dual-carrier HSDPA supporting aggregation of two 5 MHz HSDPA carriers together, Release 10 specified 4-carrier HSDPA, and in Release 11 the work on 8-carrier HSDPA is currently ongoing with the goal being to provide support for up to eight 5 MHz HSDPA carriers.

SUMMARY

The below summary section is intended to be merely exemplary and non-limiting.

The foregoing and other problems are overcome, and other advantages are realized, by the use of various exemplary embodiments.

In a first aspect thereof an exemplary embodiment provides a method for HSPA DL feedback signaling using UL LTE subframes. The method includes composing UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The method also includes transmitting the UL feedback signaling on the plurality of UL LTE subframes.

In another aspect thereof an exemplary embodiment provides an apparatus to provide HSPA DL feedback signaling using UL LTE subframes. The apparatus includes at least one processor; and at least one memory storing computer program code. The at least one memory and the computer program code are configured to, with the at least one processor, cause the apparatus to perform actions. The actions include composing UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The actions also include transmitting the UL feedback signaling on the plurality of UL LTE subframes.

In a further aspect thereof an exemplary embodiment provides a computer readable medium to provide HSPA DL feedback signaling using UL LTE subframes. The computer readable medium is tangibly encoded with a computer program executable by a processor to perform actions. The actions include composing UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The actions also include transmitting the UL feedback signaling on the plurality of UL LTE subframes.

In another aspect thereof an exemplary embodiment provides an apparatus to provide HSPA DL feedback signaling using UL LTE subframes. The apparatus includes means for composing UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The apparatus also includes means for transmitting the UL feedback signaling on the plurality of UL LTE subframes.

DETAILED DESCRIPTION

Some network service providers have expressed an interest in allowing for a hybrid solution to enable Inter-RAT (Radio Access Technology) carrier aggregation across multiple radio access technologies. In this context considerations on whether some of the component carriers could be LTE (or LTE-Advanced in general) carriers while the other carriers would be HSPA carriers has been raised. This presents an attractive option since parallel HSPA and LTE deployments are expected to be popular, and the similarities in the physical layer of the two systems make it possible to reuse the same hardware to a large extent.

Furthermore this approach would aid HSPA operators to improve the offered data rates beyond what an LTE-only deployment can offer when a new LTE network is deployed in parallel to an existing HSPA network. This can be especially beneficial to spectrum-constrained operators that wish to move to LTE but for obvious reasons cannot shut down their existing HSPA network and then use the full radio spectrum they own only for providing LTE service.

From the implementation as well as system design point of view a most straight forward solution would be to limit the usage of HSPA in inter-RAT aggregation to the DL only, and to transmit the necessary HSPA related control signaling over the LTE radio interface. This approach would avoid the problematic case of the UE transmitting on two separate radio systems simultaneously. An aspect of various exemplary embodiments relates to the UL signaling principles and procedures needed to provide support for sending HSPA feedback signaling (including, for example, ACK/NACK, CQIs (Channel Quality Indicators) and PCI (Precoding Control Indicator)) over the LTE UL radio interface utilizing signaling mechanisms developed for LTE CA.

Based on the foregoing it can be appreciated that an attractive implementation approach is to utilize the LTE uplink for the transmission of all UL control signaling for both the LTE and HSPA RATs. This approach resolves the issues related to simultaneous transmission of multiple radios in the UE (RF emission issues, power consumption, etc). Furthermore, it is currently reasonable to assume that the need for increased peak data rates in the UL, and hence CA in general, is significantly less important than in the DL direction as a typical DL:UL data demand ratio experienced today is approximately 8:1.

Note that it is possible for the HSPA DLs to be simply treated as a Secondary cell(s) from the LTE UL point of view, and the HSDPA DL carriers can be directly integrated into the LTE-A downlink carrier aggregation framework.

Figure 2:
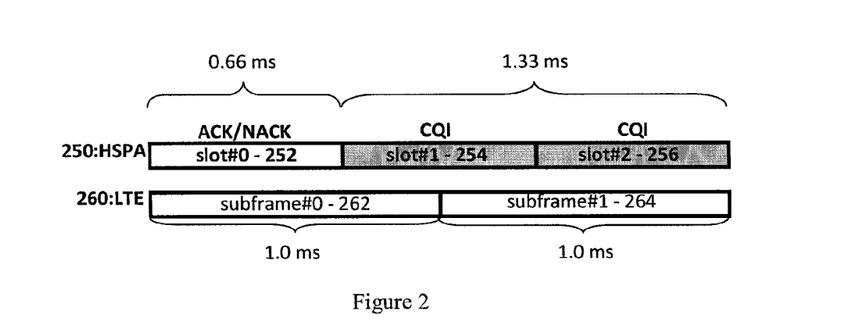
FIG. 2 shows timing principles of the HSPA and LTE frame structures, and more specifically, a HSPA the uplink feedback channel structure has been illustrated.

The timing principles of the HSPA frame structure 250 and LTE frame structure 260 are presented in FIG. 2. For HSPA the uplink feedback channel structure has been illustrated. For each 2 ms sub-frame, one 0.66 ms slot 252 is allocated for HARQ ACK/NACK feedback and two slots 254, 256 are allocated for CQI feedback. One issue that complicates the signaling/multiplexing design is the fact that the minimum transmit time interval (TTI) in HSPA is 2 ms, whereas the corresponding subframe duration in LTE is 1 ms. That is, the HSPA signals can be transmitted at the rate of every 2 ms at a maximum, corresponding to every second LTE subframe 262, 264. This issue particularly impacts the HSPA downlink associated ACK/NACK and CQI/PCI signaling in the LTE UL.

The HSPA DL supports MIMO operation with up to two codewords per carrier. This implies that the ACK/NACK feedback can constitute up to two bits per carrier. Furthermore, standardization work for Dual/Multi-Carrier HSPA has been/is being carried out in the 3GPP in Releases 8 through 11. Hence, the total number of ACK/NACK bits triggered by transmission in one HSPA DL TTI may become rather significant. Adding the CQI/PCI on top of the ACK/NACK requirements can result in a need to transmit a large number of bits in a single LTE UL subframe. If one considers the Rel-10 HSDPA maximum configuration of four carriers, with MIMO being used with all four carriers, this would correspond to a requirement to provide up to eight ACK/NACKs per HSDPA TTI, and eight CQIs every second HSDPA TTI, as with larger carrier combinations the HSDPA CQIs of different carriers are time-multiplexed to every second uplink TTI as per current HSPA specifications. In Rel-11 8-Carrier HSDPA is being developed, thereby again doubling the UL feedback needs.

Furthermore, for each configured carrier for each TTI the HARQ feedback needs to be able to be either 3-state (non-MIMO, or 2×2 MIMO when a single transport block was scheduled: ACK, NACK, or DTX indicating no control channel was detected on that carrier), or 5-state (2×2 MIMO when two transport blocks were scheduled: ACK/ACK, ACK/NACK, NACK/ACK, NACK/NACK, or DTX indicating no control channel was detected on that carrier).

Similar problems apply to the CQI reporting, where the LTE uplink needs to support the variety of different HSDPA CQI feedback configurations.

Figure 3:
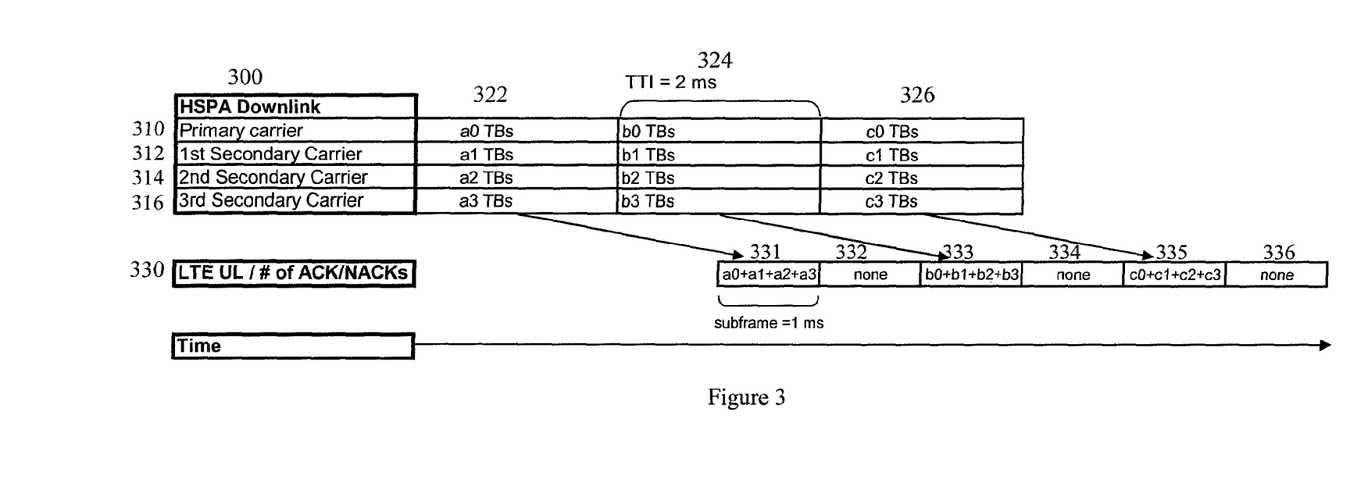
FIG. 3 shows a timing relationship for HARQ between HSPA DL and LTE UL, and illustrates a problem solved by various exemplary embodiments.

If a simple fixed linkage between HSPA DL TTI and LTE UL subframe is adopted for HSPA control signal transmission purposes, a particular problem arises. That is, all of the ACK/NACKs and CQIs linked to a given TTI in HSPA would be concentrated into a single LTE UL subframe, whereas the next LTE subframe would contain no HSPA ACK/NACKs or CQIs at all. This results in a significant imbalance in the LTE PUCCH loading as illustrated in FIG. 3 with ACK/NACKs. The HARK ACK/NACK uplink feedback for the downlink HSPA carriers is concentrated in only half of the LTE UL subframes.

As shown, the HSPA DL 300 is divided into four carriers: a primary carrier 310 and three secondary carriers 312, 314, 316. In each 2 ms TTI 322, 324, 326, the HSPA carriers 310, 312, 314, 316 provide a TB. For example, in the first TTI 322 the primary carrier 310 provides TB a0, the first secondary carrier 312 provides TB a1, the second secondary carrier 314 provides TB a2 and the third secondary carrier 316 provides TB a3. The LTE frame structure 330 is used to provide ACK/NACK signaling for the HSPA TB.

The ACK/NACK for a TB is mapped to a subframe regards of the carrier used. This leads to an imbalance as one subframe is used to provide ACK/NACK signaling for the TB in all the carriers and a second subframe is not used for ACK/NACK signaling at all. As shown in FIG. 3, LTE ACK/NACK signaling 330 regarding the four TB in a first TTI 322 is provided in a first subframe 331 while a second subframe 332 carries no ACK/NACK signaling. Similarly, subframes 333 and 335 provide ACK/NACK signaling for TTI 324 and 326 respectively while subframes 334 and 336 carry none.

This approach thus exhibits several clear drawbacks. First, the highly imbalanced UL control channel (PUCCH or PUSCH) loading between odd and even numbered LTE UL subframes complicates efficient PUCCH resource management, leading to excess overhead and scheduling complications. Second, the coverage of HSPA ACK/NACK and CQI/PCI signaling is compromised as the required signal to interference and noise ratio (SINR) increases in proportion to the number of control signaling bits/subframe.

Reference regarding a basic system architecture for uplink and downlink LTE and HSDPA CA can be made to US Patent Publication No. 2011-0134831, filed Dec. 3, 2009, "Architecture Providing Multi-System Carrier Aggregation", Juho M. O. Pirskanen, the disclosure of which is incorporated by reference herein in its entirety.

Reference regarding feedback signaling for LTE and HSPA DL can be made to US Patent Publication No. 2011-0268048, filed May 5, 2010, "Feedback for Inter-Radio Access Technology Carrier Aggregation", Antti A. Toskala et al., the disclosure of which is incorporated by reference herein in its entirety, and to U.S. patent application Ser. No. 12/906,520, filed Oct. 18, 2010, "UL ACK/NACK for Inter-Radio Access Technology Carrier Aggregation", Timo Lunttila et al., the disclosure of which is incorporated by reference herein in its entirety.

The use of exemplary embodiments provides a technique that addresses and solves the PUCCH loading temporal imbalance issue that was discussed above.

Figure 4:
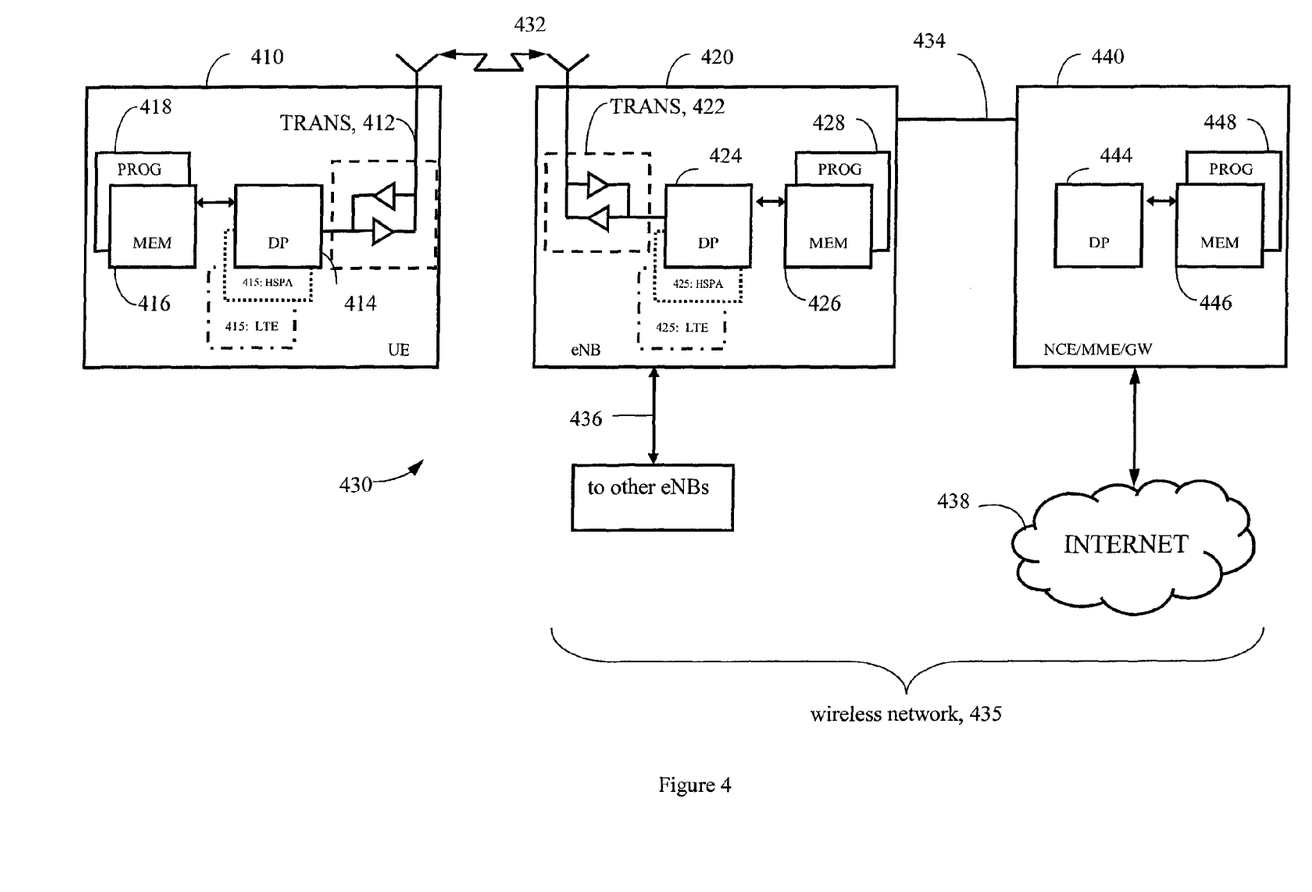
FIG. 4 shows a simplified block diagram of various electronic devices that are suitable for use in practicing exemplary embodiments.

Before describing in further detail assorted exemplary embodiments, reference is made to FIG. 4 for illustrating a simplified block diagram of various electronic devices and apparatus that are suitable for use in practicing various exemplary embodiments.

In the wireless system 430 of FIG. 4, a wireless network 435 is adapted for communication over a wireless link 432 with an apparatus, such as a mobile communication device which may be referred to as a UE 410, via a network access node, such as a Node B (base station), and more specifically an eNB 420. The network 435 may include a network control element (NCE) 440 that may include the MME/SGW functionality shown in FIG. 1A, and which provides connectivity with a network, such as a telephone network and/or a data communications network (e.g., the Internet 438).

The UE 410 includes a controller, such as a computer or a data processor (DP) 414, at least one computer-readable memory medium embodied as a memory (MEM) 416 that stores a program of computer instructions (PROG) 418, and a suitable wireless interface, such as radio frequency (RF) transceiver 412, for bidirectional wireless communications with the eNB 420 via one or more antennas.

The eNB 420 also includes a controller, such as a computer or a data processor (DP) 424, at least one computer-readable memory medium embodied as a memory (MEM) 426 that stores a program of computer instructions (PROG) 428, and a suitable wireless interface, such as RF transceiver 422, for communication with the UE 410 via one or more antennas (typically several when multiple input/multiple output (MIMO) operation is in use). The eNB 420 is coupled via a data/control path 434 to the NCE 440. The path 434 may be implemented as the S1 interface shown in FIG. 1A. The eNB 420 may also be coupled to another eNB via data/control path 436, which may be implemented as the X2 interface shown in FIG. 1A.

The NCE 440 includes a controller, such as a computer or a data processor (DP) 444, a computer-readable memory medium embodied as a memory (MEM) 446 that stores a program of computer instructions (PROG) 448.

For the purposes of describing various exemplary embodiments, the UE 410 can be assumed to also include various cellular engines 415, including HSPA and LTE engines that are arranged to operate in accordance with and implement the appropriate standardization documents and related protocols. The eNB 420 includes at least complementary HSPA and LTE cellular engines 425.

At least one of the PROGs 418, 428 and 448 is assumed to include program instructions that, when executed by the associated DP, enable the device to operate in accordance with exemplary embodiments, as will be discussed below in greater detail. That is, various exemplary embodiments may be implemented at least in part by computer software executable by the DP 414 of the UE 410; by the DP 424 of the eNB 420; and/or by the DP 444 of the NCE 440, or by hardware, or by a combination of software and hardware (and firmware).

In general, the various embodiments of the UE 410 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 416, 426 and 446 may be of any type suitable to the local technical environment and may be implemented using any suitable data storage technology, such as semiconductor based memory devices, flash memory, magnetic memory devices and systems, optical memory devices and systems, fixed memory and removable memory. The DPs 414, 424 and 444 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 412 and 422) may be of any type suitable to the local technical environment and may be implemented using any suitable communication technology such as individual transmitters, receivers, transceivers or a combination of such components.

An aspect of various exemplary embodiments defines a relationship/mapping between the HSPA DL carriers and LTE UL subframes for the purpose of enabling time-domain multiplexing between HSPA-related control signals for different HSPA carriers.

Figure 5:
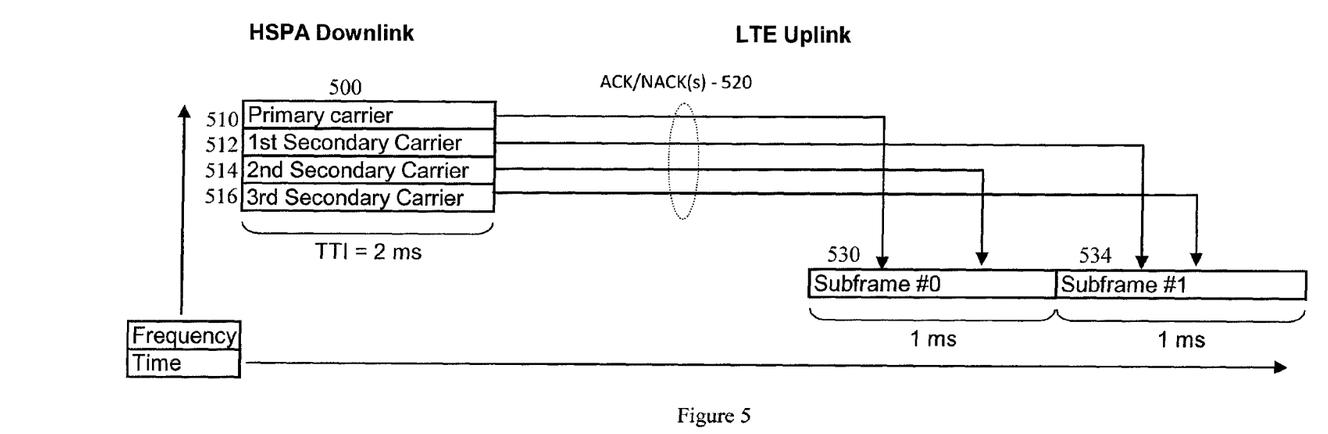
FIG. 5 depicts another possible HARQ ACK/NACK uplink feedback timing relationship between different HSPA DL Carriers and LTE UL subframes in accordance with exemplary embodiments.

More specifically, particular exemplary embodiments define a predetermined control signal timing association which depends on the index of the HSPA DL Carrier used in a given TTI. The basic principle is illustrated in FIG. 5. In this example HSDPA HARQ ACK/NACK feedback of different DL carriers in one downlink sub-frame 500 is time-multiplexed to two consecutive 1 ms LTE subframes 530, 534. The ACK/NACK(s) 520 for the primary HSPA carrier 510 in a given TTI 500 are sent in the LTE UL subframe with even numbering (subframe #0 530 in the present example) and the ACK/NACK(s) 520 for the first secondary carrier 512 in the odd numbered (subframe #1 534) LTE subframe. Further the ACK/NACK(s) 520 for the second secondary HSPA carrier 514 are sent in the LTE UL subframe with even numbering (subframe #0 530) and the ACK/NACK(s) 520 for the third secondary carrier 516 in the odd numbered (subframe #1 534) LTE UL subframe.

The illustrated HSPA DL Carrier to LTE UL subframe association is exemplary and other associations could be used. The relationship can also be made configurable so that the eNB 420 has the freedom to select the timing corresponding to each HSPA DL carrier by signaling it to the UE 410 in DL signaling.

Figure 6:
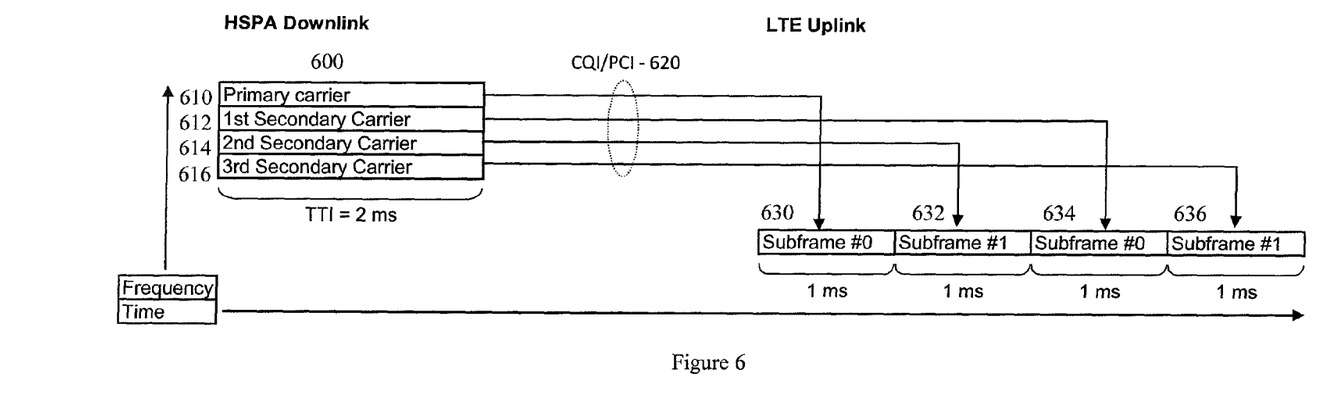
FIG. 6 illustrates a CQI timing association between different HSPA DL Carriers and LTE UL subframes in accordance with exemplary embodiments.

Moreover, the same principle of predetermined timing can be directly applied to CQI/PCI feedback signaling as well. In FIG. 6 the HSDPA CQI feedback 620 of the four downlink carriers 610, 612, 614, 616 is time-multiplexed to four consecutive 1 ms LTE subframes 630, 632, 634, 636. Thus, the HSDPA CQI/PCI 620 for carriers 610, 612, 614, 616 in a given TTI 600 are distributed over 4 LTE subframes 630, 632, 634, 636 as opposed to multiplexing CQI/PCI of multiple carriers in one subframe.

In one exemplary embodiment the carrier-to-subframe association can be fixed and based on the carrier index as illustrated in FIG. 5 and FIG. 6.

Alternatively, in another exemplary embodiment the association can be signaled to the UE 410 explicitly using, for example, RRC signaling for each HSPA DL carrier Both of these embodiments are equally applicable for the cases when the control signaling is transmitted over either the PUCCH or PUSCH. From the LTE UL point of view the TDM split of the ACK/NACK signaling into two UL subframes impacts the ACK/NACK codebook size in the two subframes, which serves to better balance the UL signaling.

By the use of various exemplary embodiments the ACK/NACK load in the LTE UL due to HSPA DL transmissions can be balanced among different LTE subframes, and the coverage of the HSPA ACK/NACKs and CQI/PCIs is preserved by not having to transmit too large of a number of bits in a single UL subframe.

It is also within the scope of selected exemplary embodiments to use a simplified set of HARQ-ACK encodings and consider, for example, using one encoding for non-MIMO HARQ-ACK and another encoding for MIMO HARQ-ACK, as opposed to using the more complicated set of encodings and mappings as is currently done for HSDPA feedback for different MIMO and carrier configurations.

Based on the foregoing it should be apparent that assorted exemplary embodiments provide a method, apparatus and computer program(s) to provide an enhanced technique to provide HSPA DL feedback signaling using UL LTE subframes.

Figure 7:
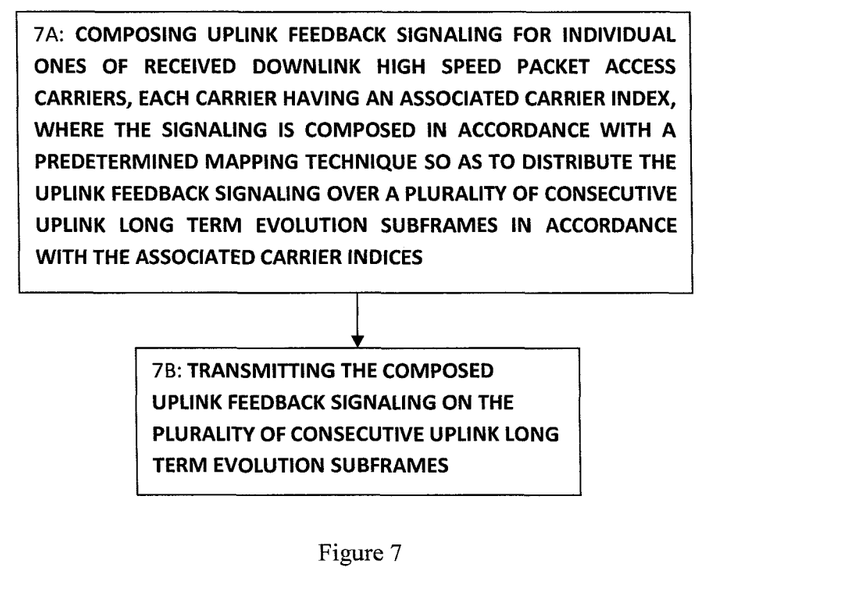
FIG. 7 is a logic flow diagram that illustrates the operation of a method, and a result of execution of computer program instructions embodied on a computer readable medium, in accordance with various exemplary embodiments.

FIG. 7 is a logic flow diagram that illustrates the operation of a method, and a result of execution of computer program instructions, in accordance with exemplary embodiments. In accordance with these exemplary embodiments a method performs, at Block 7A, a step of composing uplink feedback signaling for individual ones of received downlink high speed packet access carriers, each carrier having an associated carrier index, where the signaling is composed in accordance with a predetermined mapping technique so as to distribute the uplink feedback signaling over a plurality of consecutive uplink long term evolution subframes in accordance with the associated carrier indices. In Block 7B there is a step of transmitting the composed uplink feedback signaling on the plurality of consecutive uplink long term evolution subframes.

In the method depicted in FIG. 7, where the predetermined mapping technique is defined in signaling received from a network access node.

In the method depicted in FIG. 7, where the predetermined mapping technique is defined in radio resource control signaling received from a network access node.

In the method depicted in FIG. 7, where the predetermined mapping technique causes the uplink signaling to be composed such that an ACK/NACK indication for a primary downlink high speed packet access carrier is assigned to a subframe 0 of the uplink long term evolution subframe, and an ACK/NACK indication for a first secondary downlink high speed packet access carrier is assigned to a subframe 1 of the uplink long term evolution subframe.

In the method depicted in FIG. 7 and described in the preceding paragraph, where the predetermined mapping technique causes the uplink signaling to be composed such that an ACK/NACK indication for a second secondary downlink high speed packet access carrier is assigned to the subframe 0 of the uplink long term evolution subframe, and an ACK/NACK indication for a third secondary downlink high speed packet access carrier is assigned to the subframe 1 of the uplink long term evolution subframe.

In the method depicted in FIG. 7, where the predetermined mapping technique causes the uplink signaling to be composed such that a channel quality indicator for a primary downlink high speed packet access carrier is assigned to a first subframe 0 of the uplink long term evolution subframe, a channel quality indicator for a first secondary downlink high speed packet access carrier is assigned to a next occurring second subframe 0 of the uplink long term evolution subframe, a channel quality indicator for a second secondary downlink high speed packet access carrier is assigned to a first subframe 1 of the uplink long term evolution subframe following the first subframe 0, and a channel quality indicator for a third secondary downlink high speed packet access carrier is assigned to a next occurring subframe 1 of the uplink long term evolution subframe following the second subframe 0.

In the method depicted in FIG. 7, where the predetermined mapping technique causes the uplink signaling to be composed such that a precoding control indicator for a primary downlink high speed packet access carrier is assigned to a first subframe 0 of the uplink long term evolution subframe, a precoding control indicator for a first secondary downlink high speed packet access carrier is assigned to a next occurring second subframe 0 of the uplink long term evolution subframe, a precoding control indicator for a second secondary downlink high speed packet access carrier is assigned to a first subframe 1 of the uplink long term evolution subframe following the first subframe 0, and a precoding control indicator for a third secondary downlink high speed packet access carrier is assigned to a next occurring subframe 1 of the uplink long term evolution subframe following the second subframe 0.

In the method of FIG. 7 and any one of the preceding paragraphs descriptive of FIG. 7, where the plurality of consecutive uplink long term evolution subframes comprise a part of a physical uplink control channel or a physical uplink shared channel.

Various exemplary embodiments also encompass a non-transitory computer-readable medium that contains software program instructions, where execution of the software program instructions by at least one data processor results in performance of operations that comprise execution of the method depicted in FIG. 7 and described in the foregoing several paragraphs.

The various blocks shown in FIG. 7 may be viewed as method steps, and/or as operations that result from operation of computer program code, and/or as a plurality of coupled logic circuit elements constructed to carry out the associated function(s).

An exemplary embodiment is a method to provide HSPA DL feedback signaling using UL LTE subframes. The method includes composing (e.g., by a processor) UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The method also includes transmitting (e.g., by a transmitter) the UL feedback signaling on the plurality of UL LTE subframes.

In a further exemplary embodiment of the method above, the mapping is defined in signaling received from a network access node.

In another exemplary embodiment of any one of the methods above, the mapping is defined in RRC signaling received from a network access node.

In a further exemplary embodiment of any one of the methods above, the mapping is also configured to distribute an ACK/NACK indication for a primary DL HSPA carrier to a first subframe of the plurality of UL LTE subframes, and an ACK/NACK indication for a first secondary DL HSPA carrier to a different, second subframe of the plurality of UL LTE subframes. The mapping may also be configured to distribute an ACK/NACK indication for a second secondary DL HSPA carrier to the first subframe, and an ACK/NACK indication for a third secondary DL HSPA carrier to the second subframe.

In another exemplary embodiment of any one of the methods above, the mapping is also configured to distribute a channel quality indicator for a primary DL HSPA carrier to a first subframe 0 of the plurality of UL LTE subframes, a channel quality indicator for a first secondary DL HSPA carrier to a next occurring second subframe 0 of the plurality of UL LTE subframes, a channel quality indicator for a second secondary DL HSPA carrier to a first subframe 1 of the plurality of UL LTE subframes following the first subframe 0, and a channel quality indicator for a third secondary DL HSPA carrier to a second subframe 1 of the plurality of UL LTE subframes following the second subframe 0.

In a further exemplary embodiment of any one of the methods above, the mapping is also configured to distribute a precoding control indicator for a primary DL HSPA carrier to a first subframe 0 of the plurality of UL LTE subframes, a precoding control indicator for a first secondary DL HSPA carrier is assigned to a next occurring second subframe 0 of the plurality of UL LTE subframes, a precoding control indicator for a second secondary DL HSPA carrier to a first subframe 1 of the plurality of UL LTE subframes following the first subframe 0, and a precoding control indicator for a third secondary DL HSPA carrier to a second subframe 1 of the plurality of UL LTE subframes following the second subframe 0.

In another exemplary embodiment of any one of the methods above, the plurality of UL LTE subframes includes a part of a PUCCH or a part of a PUSCH.

Another exemplary embodiment is an apparatus to provide HSPA DL feedback signaling using UL LTE subframes. The apparatus includes at least one processor; and at least one memory storing computer program code. The at least one memory and the computer program code are configured to, with the at least one processor, cause the apparatus to perform actions. The actions include composing UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The actions also include transmitting the UL feedback signaling on the plurality of UL LTE subframes.

In a further exemplary embodiment of the apparatus above, the mapping is defined in signaling received from a network access node.

In another exemplary embodiment of any one of the apparatus above, the mapping is defined in RRC signaling received from a network access node.

In a further exemplary embodiment of any one of the apparatus above, the mapping is also configured to distribute an ACK/NACK indication for a primary DL HSPA carrier to a first subframe of the plurality of UL LTE subframes, and an ACK/NACK indication for a first secondary DL HSPA carrier to a different, second subframe of the plurality of UL LTE subframes. The mapping may also be configured to distribute an ACK/NACK indication for a second secondary DL HSPA carrier to the first subframe, and an ACK/NACK indication for a third secondary DL HSPA carrier to the second subframe.

In another exemplary embodiment of any one of the apparatus above, the mapping is also configured to distribute a channel quality indicator for a primary DL HSPA carrier to a first subframe 0 of the plurality of UL LTE subframes, a channel quality indicator for a first secondary DL HSPA carrier to a next occurring second subframe 0 of the plurality of UL LTE subframes, a channel quality indicator for a second secondary DL HSPA carrier to a first subframe 1 of the plurality of UL LTE subframes following the first subframe 0, and a channel quality indicator for a third secondary DL HSPA carrier to a second subframe 1 of the plurality of UL LTE subframes following the second subframe 0.

In a further exemplary embodiment of any one of the apparatus above, the mapping is also configured to distribute a precoding control indicator for a primary DL HSPA carrier to a first subframe 0 of the plurality of UL LTE subframes, a precoding control indicator for a first secondary DL HSPA carrier is assigned to a next occurring second subframe 0 of the plurality of UL LTE subframes, a precoding control indicator for a second secondary DL HSPA carrier to a first subframe 1 of the plurality of UL LTE subframes following the first subframe 0, and a precoding control indicator for a third secondary DL HSPA carrier to a second subframe 1 of the plurality of UL LTE subframes following the second subframe 0.

In another exemplary embodiment of any one of the apparatus above, the plurality of UL LTE subframes includes a part of a PUCCH or a part of a PUSCH.

In a further exemplary embodiment of any one of the apparatus above, the apparatus is embodied in a mobile device.

In another exemplary embodiment of any one of the apparatus above, the apparatus is embodied in an integrated circuit.

A further exemplary embodiment is a computer readable medium to provide HSPA DL feedback signaling using UL LTE subframes. The computer readable medium is tangibly encoded with a computer program executable by a processor to perform actions. The actions include composing UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The actions also include transmitting the UL feedback signaling on the plurality of UL LTE subframes.

In another exemplary embodiment of the computer readable medium above, the mapping is defined in signaling received from a network access node.

In a further exemplary embodiment of any one of the computer readable media above, the mapping is defined in RRC signaling received from a network access node.

In another exemplary embodiment of any one of the computer readable media above, the mapping is also configured to distribute an ACK/NACK indication for a primary DL HSPA carrier to a first subframe of the plurality of UL LTE subframes, and an ACK/NACK indication for a first secondary DL HSPA carrier to a different, second subframe of the plurality of UL LTE subframes. The mapping may also be configured to distribute an ACK/NACK indication for a second secondary DL HSPA carrier to the first subframe, and an ACK/NACK indication for a third secondary DL HSPA carrier to the second subframe.

In a further exemplary embodiment of any one of the computer readable media above, the mapping is also configured to distribute a channel quality indicator for a primary DL HSPA carrier to a first subframe 0 of the plurality of UL LTE subframes, a channel quality indicator for a first secondary DL HSPA carrier to a next occurring second subframe 0 of the plurality of UL LTE subframes, a channel quality indicator for a second secondary DL HSPA carrier to a first subframe 1 of the plurality of UL LTE subframes following the first subframe 0, and a channel quality indicator for a third secondary DL HSPA carrier to a second subframe 1 of the plurality of UL LTE subframes following the second subframe 0.

In another exemplary embodiment of any one of the computer readable media above, the mapping is also configured to distribute a precoding control indicator for a primary DL HSPA carrier to a first subframe 0 of the plurality of UL LTE subframes, a precoding control indicator for a first secondary DL HSPA carrier is assigned to a next occurring second subframe 0 of the plurality of UL LTE subframes, a precoding control indicator for a second secondary DL HSPA carrier to a first subframe 1 of the plurality of UL LTE subframes following the first subframe 0, and a precoding control indicator for a third secondary DL HSPA carrier to a second subframe 1 of the plurality of UL LTE subframes following the second subframe 0.

In a further exemplary embodiment of any one of the computer readable media above, the plurality of UL LTE subframes includes a part of a PUCCH or a part of a PUSCH.

In another exemplary embodiment of any one of the computer readable media above, the computer readable medium is a non-transitory computer readable medium (e.g., CD-ROM, RAM, flash memory, etc.).

Another exemplary embodiment is an apparatus to provide HSPA DL feedback signaling using UL LTE subframes. The apparatus includes means for composing (e.g., a processor) UL feedback signaling for individual ones of a plurality of received DL HSPA carriers, each carrier having an associated carrier index. The UL feedback signaling is composed in accordance with a mapping configured to distribute the UL feedback signaling over a plurality of UL LTE subframes based at least in part on the associated carrier indices. The apparatus also includes means for transmitting (e.g., a transmitter) the UL feedback signaling on the plurality of UL LTE subframes.

In a further exemplary embodiment of the apparatus above, the mapping is defined in signaling received from a network access node.

In another exemplary embodiment of any one of the apparatus above, the mapping is defined in RRC signaling received from a network access node.

In a further exemplary embodiment of any one of the apparatus above, the mapping is also configured to distribute an ACK/NACK indication for a primary DL HSPA carrier to a first subframe of the plurality of UL LTE subframes, and an ACK/NACK indication for a first secondary DL HSPA carrier to a different, second subframe of the plurality of UL LTE subframes. The mapping may also be configured to distribute an ACK/NACK indication for a second secondary DL HSPA carrier to the first subframe, and an ACK/NACK indication for a third secondary DL HSPA carrier to the second subframe.

In another exemplary embodiment of any one of the apparatus above, the mapping is also configured to distribute a channel quality indicator for a primary DL HSPA carrier to a first subframe 0 of the plurality of UL LTE subframes, a channel quality indicator for a first secondary DL HSPA carrier to a next occurring second subframe 0 of the plurality of UL LTE subframes, a channel quality indicator for a second secondary DL HSPA carrier to a first subframe 1 of the plurality of UL LTE subframes following the first subframe 0, and a channel quality indicator for a third secondary DL HSPA carrier to a second subframe 1 of the plurality of UL LTE subframes following the second subframe 0.

In a further exemplary embodiment of any one of the apparatus above, the mapping is also configured to distribute a precoding control indicator for a primary DL HSPA carrier to a first subframe 0 of the plurality of UL LTE subframes, a precoding control indicator for a first secondary DL HSPA carrier is assigned to a next occurring second subframe 0 of the plurality of UL LTE subframes, a precoding control indicator for a second secondary DL HSPA carrier to a first subframe 1 of the plurality of UL LTE subframes following the first subframe 0, and a precoding control indicator for a third secondary DL HSPA carrier to a second subframe 1 of the plurality of UL LTE subframes following the second subframe 0.

In another exemplary embodiment of any one of the apparatus above, the plurality of UL LTE subframes includes a part of a PUCCH or a part of a PUSCH.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of exemplary embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of exemplary embodiments may be practiced in various components such as integrated circuit chips and modules, and that exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with various exemplary embodiments.

Some exemplary embodiments thus also encompass an apparatus that comprises a processor and a memory including computer program code. The memory and computer program code are configured, with the processor, to cause the apparatus at least to compose uplink feedback signaling for individual ones of received downlink high speed packet access carriers, each carrier having an associated carrier index, where the signaling is composed in accordance with a predetermined mapping technique so as to distribute the uplink feedback signaling over a plurality of consecutive uplink long term evolution subframes in accordance with the associated carrier indices. The processor and computer program code are further configured to transmit the composed uplink feedback signaling on the plurality of consecutive uplink long term evolution subframes.

Exemplary embodiments thus also encompass an apparatus that comprises means for composing uplink feedback signaling for individual ones of received downlink high speed packet access carriers (DP 414, memory 416, program 418, HSPA/LTE engines 415), each carrier having an associated carrier index, where the signaling is composed in accordance with a predetermined mapping technique so as to distribute the uplink feedback signaling over a plurality of consecutive uplink long term evolution subframes in accordance with the associated carrier indices. The apparatus further comprises means for transmitting (transmitter of RF transceiver 412) the composed uplink feedback signaling on the plurality of consecutive uplink long term evolution subframes.

Various exemplary embodiments also comprise methods, apparatus and computer program code configured to receive uplink control channel signaling from a user equipment, where the uplink control channel signaling is for individual ones of downlink high speed packet access carriers, each carrier having an associated carrier index, where the signaling is received in particular format in accordance with a predetermined mapping technique so as to distribute the uplink control channel feedback signaling over a plurality of consecutive uplink long term evolution subframes in accordance with the associated carrier indices, and to interpret in accordance with the predetermined mapping technique the uplink control channel feedback signaling that is received on the plurality of consecutive uplink long term evolution subframes.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

For example, while exemplary embodiments have been described above in the context of the E-UTRAN LTE-A and HSPA systems, it should be appreciated that the exemplary embodiments described are not limited for use with only these particular types of wireless communication system, and that they may be used to advantage in other wireless communication systems employing carrier aggregation and multiple types of downlink and uplink carriers.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., ACK/NACK, CQI, PMI, TTI, etc.) are not intended to be limiting in any respect, as these parameters may be identified by any suitable names. Further, the described mapping schemes based on DL HSPA carrier index may differ from those expressly disclosed herein. Further, the various names assigned to different channels (e.g., PDCCH, PUSCH) are not intended to be limiting in any respect, as these various channels may be identified by any suitable names.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

What is claimed is:

1. A method comprising:
composing uplink feedback signaling for individual ones of a plurality of received downlink carriers associated with a subframe duration, each carrier having an associated carrier index,
where the uplink feedback signaling is composed in accordance with a mapping configured to distribute the uplink feedback signaling over a plurality of consecutive uplink subframes associated with a different subframe duration, based at least in part on the associated carrier indices; and
transmitting the uplink feedback signaling on the plurality of consecutive uplink subframes using the different subframe duration, where the mapping is further configured to distribute:
a precoding control indicator for a first downlink carrier associated with the subframe duration to a first subframe 0 of the plurality of consecutive uplink subframes associated with the different subframe duration,
a precoding control indicator for a second downlink carrier associated with the subframe duration is assigned to a next occurring second subframe 0 of the plurality of consecutive uplink subframes,
a precoding control indicator for a third downlink carrier associated with the subframe duration to a first subframe 1 of the plurality of consecutive uplink subframes following the first subframe 0, and
a precoding control indicator for a fourth downlink carrier associated with the subframe duration to a second subframe 1 of the plurality of consecutive uplink subframes following the second subframe 0.

2. The method of claim 1, where the mapping is defined in signaling received from a network access node.

3. The method of claim 1, where the mapping is defined in radio resource control signaling received from a network access node.

4. The method of claim 1, where the mapping is further configured to distribute
an ACK/NACK indication for the first downlink carrier associated with the subframe duration to a first subframe of the plurality of consecutive uplink subframes associated with the different subframe duration, and an ACK/NACK indication for the second downlink carrier associated with the subframe duration to a different, second subframe of the plurality of consecutive uplink subframes associated with the different subframe duration.

5. The method of claim 4, where the mapping is further configured to distribute an ACK/NACK indication for the third downlink carrier associated with the subframe duration to the first subframe, and an ACK/NACK indication for the fourth downlink carrier associated with the subframe duration to the second subframe.

6. The method of claim 1, where the mapping is further configured to distribute a channel quality indicator for the first downlink carrier associated with the subframe duration to the first subframe 0 of the plurality of consecutive uplink subframes associated with a different subframe duration, a channel quality indicator for the second downlink carrier associated with the subframe duration to the next occurring second subframe 0 of the plurality of consecutive uplink subframes associated with the different subframe duration, a channel quality indicator for the third downlink carrier associated with the subframe duration to the first subframe 1 of the plurality of consecutive uplink subframes following the first subframe 0, and a channel quality indicator for the fourth downlink carrier associated with the subframe duration to the second subframe 1 of the plurality of consecutive uplink subframes following the second subframe 0.

7. The method of claim 1, where the plurality of consecutive uplink subframes comprises one of: a part of a physical uplink control channel and a part of a physical uplink data channel.

8. An apparatus comprising at least one processor; and at least one memory including computer program code, the at least one memory and the computer program code configured to, with the at least one processor, cause the apparatus to perform at least the following:

to compose uplink feedback signaling for individual ones of a plurality of received downlink carriers associated with the subframe duration, each carrier having an associated carrier index, where the uplink feedback signaling is composed in accordance with a mapping configured to distribute the uplink feedback signaling over a plurality of consecutive uplink subframes based at least in part on the associated carrier indices; and to transmit the uplink feedback signaling on the plurality of consecutive uplink subframes using the different subframe duration, where the mapping is further configured to distribute:

precoding control indicator for a first downlink carrier associated with the subframe duration to a first subframe 0 of the plurality of consecutive uplink subframes associated with the different subframe duration, a preceding control indicator for a second downlink carrier associated with the subframe duration is assigned to a next occurring second subframe 0 of the plurality of consecutive uplink subframes, a preceding control indicator for a third downlink carrier associated with the subframe duration to a first subframe 1 of the plurality of consecutive uplink subframes following the first subframe 0, and a precoding control indicator for a fourth downlink carrier associated with the subframe duration to a second subframe 1 of the plurality of consecutive uplink subframes following the second subframe 0.

9. The apparatus of claim 8, where the mapping is defined in signaling received from a network access node.

10. The apparatus of claim 8, where the mapping is defined in radio resource control signaling received from a network access node.

11. The apparatus of claim 8, where the mapping is further configured to distribute an ACK/NACK indication for the first downlink carrier associated with the subframe duration to a first subframe of the plurality of consecutive uplink subframes associated with the different subframe duration, and an ACK/NACK indication for the second downlink carrier associated with the subframe duration to a different, second subframe of the plurality of consecutive uplink subframes associated with the different subframe duration.

12. The apparatus of claim 11, where the mapping is further configured to distribute an ACK/NACK indication for the third downlink carrier associated with the subframe duration to the first subframe, and an ACK/NACK indication for the fourth downlink carrier associated with the subframe duration to the second subframe.

13. A non-transitory computer readable medium tangibly encoded with a computer program executable by a processor to perform actions comprising:

composing uplink feedback signaling for individual ones of a plurality of received downlink carriers associated with the subframe duration, each carrier having an associated carrier index, where the uplink feedback signaling is composed in accordance with a mapping configured to distribute the uplink feedback signaling over a plurality of consecutive uplink subframes associated with a different subframe duration based at least in part on the associated carrier indices; and transmitting the uplink feedback signaling on the plurality of consecutive uplink subframes using the different subframe duration, where the mapping is further configured to distribute:

a precoding control indicator for a first downlink carrier associated with the subframe duration to a first subframe 0 of the plurality of consecutive uplink subframes associated with the different subframe duration, a precoding control indicator for a second downlink carrier associated with the subframe duration is assigned to a next occurring second subframe 0 of the plurality of consecutive uplink subframes, a precoding control indicator for a third downlink carrier associated with the subframe duration to a first subframe 1 of the plurality of consecutive uplink subframes following the first subframe 0, and a precoding control indicator for a fourth downlink carrier associated with the subframe duration to a second subframe 1 of the plurality of consecutive uplink subframes following the second subframe 0.

14. The non-transitory computer readable medium of claim 13, where the mapping is defined in signaling received from a network access node.

15. The non-transitory computer readable medium of claim 13, where the mapping is defined in radio resource control signaling received from a network access node.

16. The non-transitory computer readable medium of claim 13, where the mapping is further configured to distribute
- an ACK/NACK indication for the first downlink carrier associated with the subframe duration to a first subframe of the plurality of consecutive uplink subframes associated with the different subframe duration, and
- an ACK/NACK indication for the second downlink carrier to a different, second subframe of the plurality of consecutive uplink subframes associated with the different subframe duration.

17. The non-transitory computer readable medium of claim 16, where the mapping is further configured to distribute
- an ACK/NACK indication for the third downlink carrier associated with the subframe duration to the first subframe, and
- an ACK/NACK indication for the fourth downlink carrier associated with the subframe duration to the second subframe.

18. An apparatus comprising:
- means for composing uplink feedback signaling for individual ones of a plurality of received downlink carriers associated with the subframe duration, each carrier having an associated carrier index,
- where the uplink feedback signaling is composed in accordance with a mapping configured to distribute the uplink feedback signaling over a plurality of consecutive uplink subframes associated with a different subframe duration based at least in part on the associated carrier indices; and
- means for transmitting the uplink feedback signaling on the plurality of consecutive uplink subframes using the different subframe duration, where the mapping is further configured to distribute:
  - a precoding control indicator for a first downlink carrier associated with the subframe duration to a first subframe 0 of the plurality of consecutive uplink subframes associated with the different subframe duration,
  - a precoding control indicator for a second downlink carrier associated with the subframe duration is assigned to a next occurring second subframe 0 of the plurality of consecutive uplink subframes,
  - a precoding control indicator for a third downlink carrier associated with the subframe duration to a first subframe 1 of the plurality of consecutive uplink subframes following the first subframe 0, and
  - a precoding control indicator for a fourth downlink carrier associated with the subframe duration to a second subframe 1 of the plurality of consecutive uplink subframes following the second subframe 0.

19. The apparatus of claim 18, where the mapping is defined in signaling received from a network access node.

* * * * *

UNITED STATES PATENT AND TRADEMARK OFFICE
CERTIFICATE OF CORRECTION

| | | |
|---|---|---|
| PATENT NO. | : 8,830,939 B2 | Page 1 of 1 |
| APPLICATION NO. | : 13/418510 | |
| DATED | : September 9, 2014 | |
| INVENTOR(S) | : Lunttila et al. | |

It is certified that error appears in the above-identified patent and that said Letters Patent is hereby corrected as shown below:

In the Claims

Claim 9, col. 17, line 60 "preceding" should be deleted and --precoding-- should be inserted.

Signed and Sealed this
Eleventh Day of November, 2014

Michelle K. Lee
*Deputy Director of the United States Patent and Trademark Office*